April 10, 1945.　　　G. GARBETH　　　2,373,304
ROTARY INTERNAL-COMBUSTION ENGINE
Filed March 1, 1943　　　3 Sheets-Sheet 1

INVENTOR
George Garbeth
BY
*Webster & Webster*
ATTORNEYS

April 10, 1945.   G. GARBETH   2,373,304
ROTARY INTERNAL-COMBUSTION ENGINE
Filed March 1, 1943   3 Sheets-Sheet 2

INVENTOR
George Garbeth
BY
ATTORNEYS

April 10, 1945. G. GARBETH 2,373,304
ROTARY INTERNAL-COMBUSTION ENGINE
Filed March 1, 1943 3 Sheets-Sheet 3
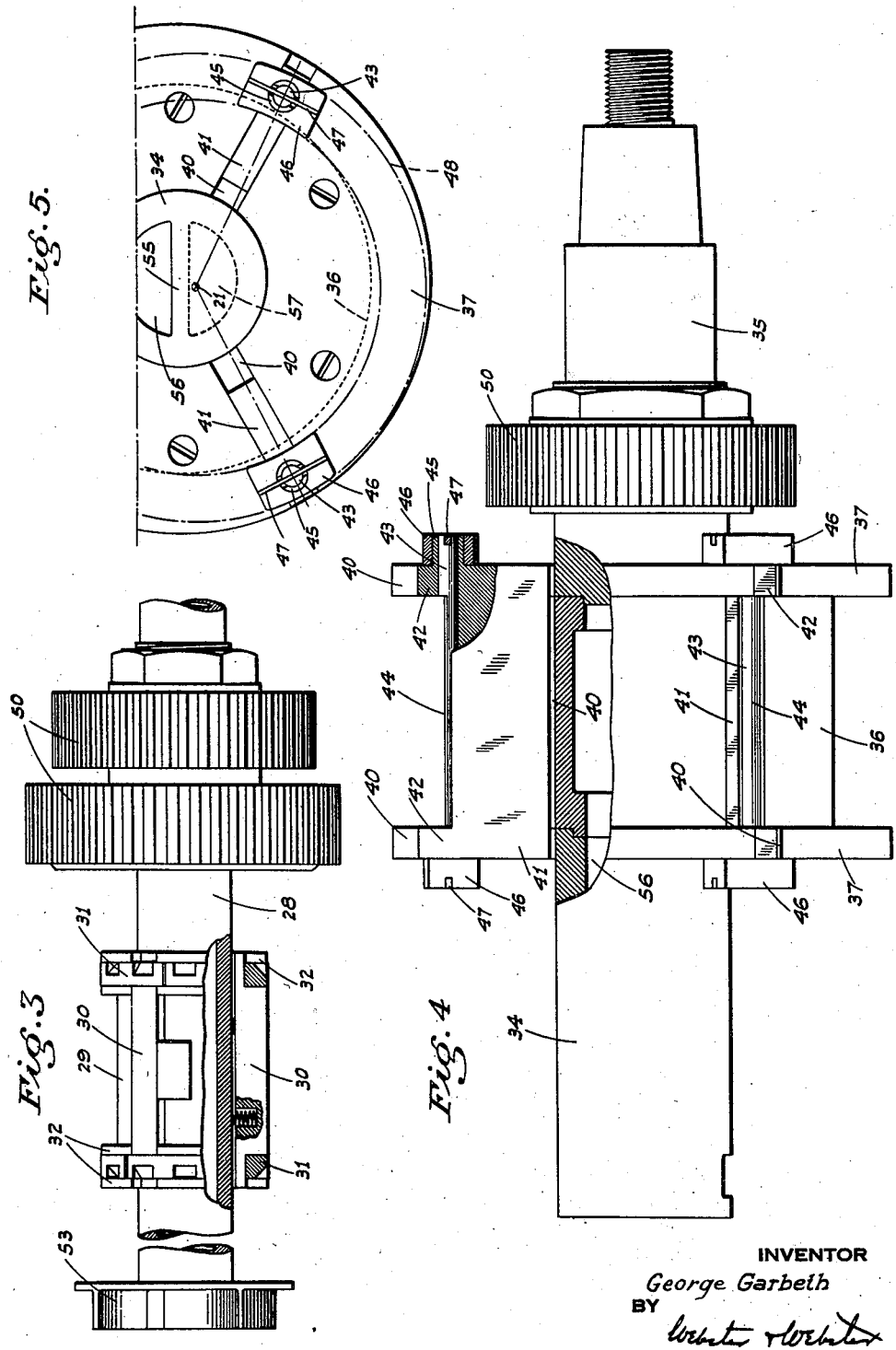
INVENTOR
George Garbeth
BY
ATTORNEYS Patented Apr. 10, 1945

2,373,304

UNITED STATES PATENT OFFICE 2,373,304

ROTARY INTERNAL-COMBUSTION ENGINE

George Garbeth, Stockton, Calif.

Application March 1, 1943, Serial No. 477,521

5 Claims. (Cl. 123—16)

This invention relates to internal combustion engines of that general type in which power is derived from the expansion of exploded charges directed against vanes slidable in a rotor and engaging the circular wall of a chamber eccentric to the rotor.

Because of the pressure of the charges against the vanes, great difficulty has heretofore been encountered in moving the vanes out and also maintaining the necessary pressure-tight fit of said vanes against the eccentric chamber wall, and various relatively complicated devices, which tend to give trouble under high operating temperatures and other conditions, have been proposed to avoid these difficulties, but without success.

One of the objects of the present invention is to overcome the above difficulties by the provision of a simple and effective means for positively shifting the vanes as the rotor turns, and causing said vanes to be always maintained in close contact with the eccentric chamber wall. This means is arranged so that the actuating or control features thereof are out of the chamber itself, so that such features do not tend to be effected by the direct flame, carbon, or other products of combustion, and hence do not tend to stick or freeze.

The engine includes a charge intake and compression unit, a power generating unit, and a transfer unit in which the charge is fired but not expanded, and which transfers the compressed charge as it is fired from the compression unit to the power generating unit.

Another object of the invention is to arrange these units in a compact and simplified manner, and so that the operating movements thereof may be readily coordinated.

In connection with such combined arrangement of units, a further object is to provide an extremely efficient and simple cooling water circulator system, so arranged that water is continuously circulated through the engine from its hottest to its coolest source, and so that with such circulation the water passes through the interior of the transfer and power units (the hottest points), as well as about the exterior of the same, so that overheating and consequent undue expansion and other troubles are avoided.

Other advantages of my improved engine will be apparent from the following specification.

These objects I accomplish by means of such structure and relative arrangement of parts as will fully appear by a perusal of the following specification and claims.

In the drawings similar characters of reference indicate corresponding parts in the several views:

Figure 3 is a fragmentary longitudinal view partly in section of the mixture transfer unit detached.

Figure 4 is a similar view of the power rotor unit detached.

Figure 5 is a fragmentary end elevation of said rotor unit.

Figure 1:
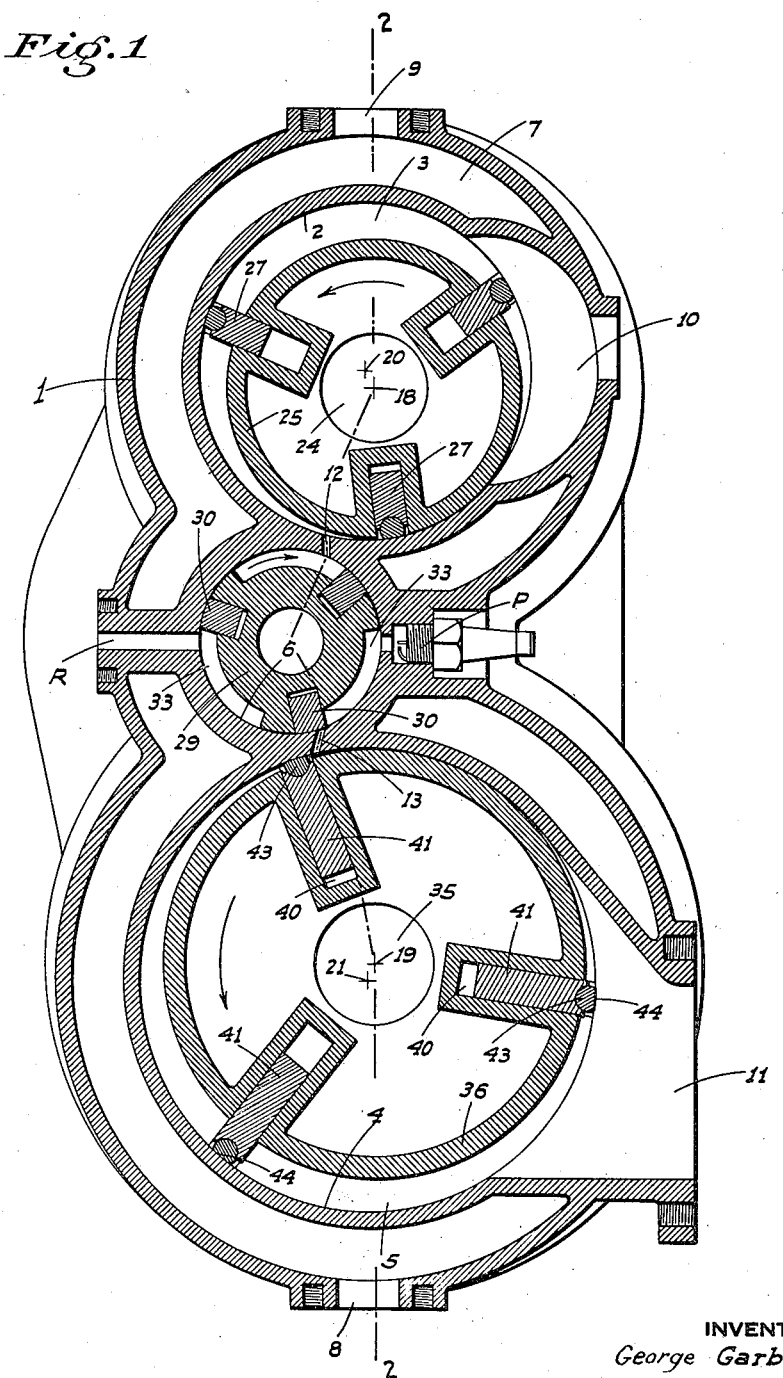
Figure 1 is a transverse section of my improved engine.
Figure 2:
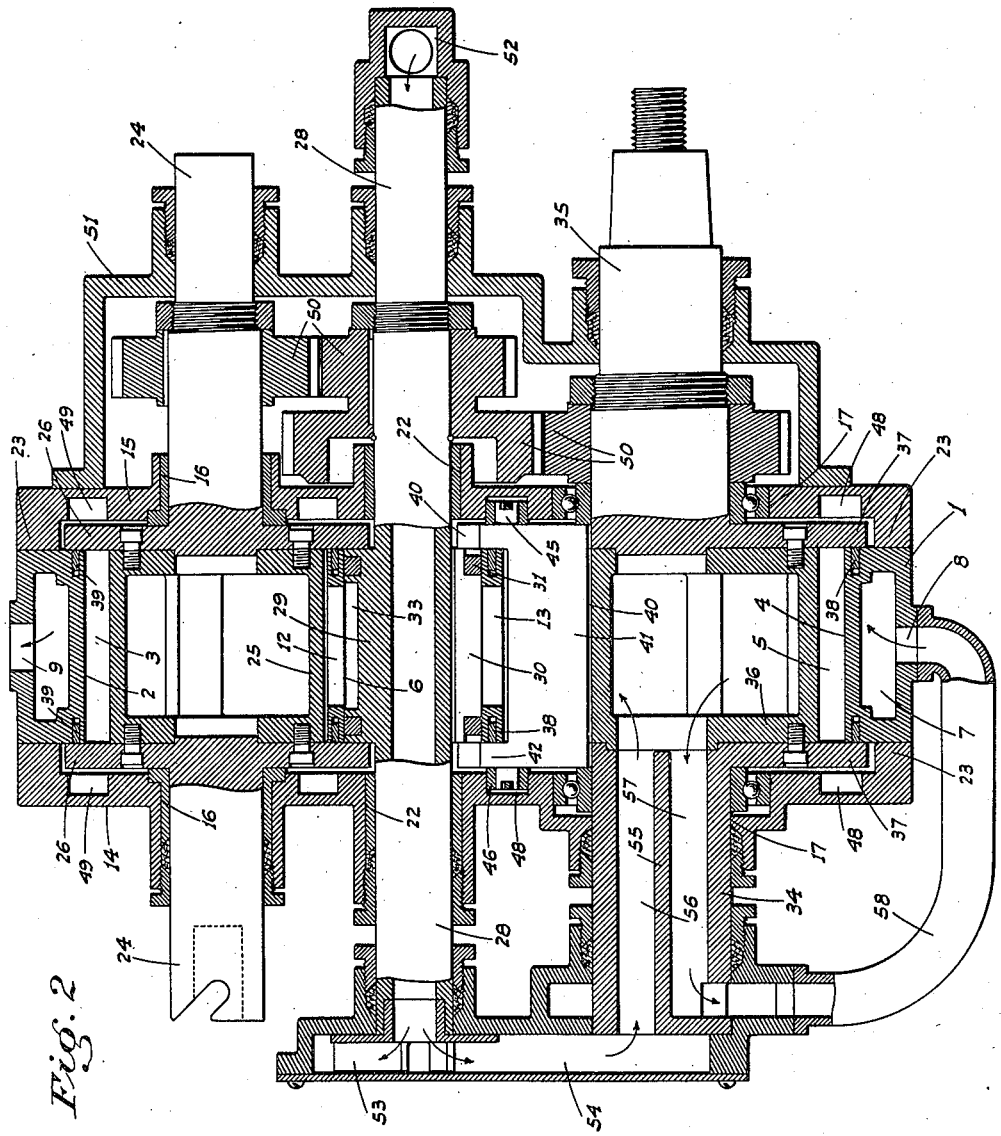
Figure 2 is a longitudinal section of the same substantially on the line 2—2 of Fig. 1.

Referring now more particularly to the characters of reference on the drawings, the engine comprises a main casing 1 having flat parallel end walls. This casing is formed with a top circular bore 2 forming the peripheral wall of the compression chamber 3; a bottom circular bore forming the peripheral wall of the expansion or power chamber 5, and another circular bore 6 between the bores 2 and 4 forming the transfer chamber in which the mixture transfer rotor is disposed. The casing is formed with a water jacket 7 extending about the bores and having an outlet 8 at the top and an inlet 9 at the bottom. The casing is also formed with a mixture intake passage 10 communicating with the chamber 3 on one side and an exhaust passage 11 on the same side of the engine leading from the chamber 5. A slot-like port 12 extends between the bore 6 and chamber 3 near the bottom, and a similar port 13 extends between said bore 6 and the chamber 4 adjacent the top of the latter. A spark plug P, or similar ignition device, is mounted in the casing on the same side and with its inner end exposed to the bore 6 between ports 12 and 13. Although one plug is shown others may be added to provide dual or multiple ignition, if desired. A relief or scavenging passage R leads through the casing wall from the opposite side of the bore 6 (see Fig. 1).

Cover plates 14 and 15, of identical form on their inner faces, are secured on the ends of the casing 1 by suitable means, each plate having shaft receiving bores 16 and 17 for the chambers 3 and 5, which are disposed on centers 18 and 19 offset from the centers 20 and 21 respectively of said chambers, and another shaft bore 22 concentric with the casing bore 6. Each plate also has an inwardly projecting flange 23 about its periphery which engages the casing ends, the inner periphery of said flange being of a larger size than the casing bores and concentric with the centers 18 and 19 so as to leave a clear space between the plate and the casing radially out from the various bores therein.

Turnable on the shaft bores 16 in the plates 14 and 15 are alined shaft sections 24, which are secured on the ends of a rotor 25 concentric with said shaft sections and disposed in the chamber 3; and including end flanges 26 of larger diameter engaging the ends of the casing and projecting into the spaces between the end plates and said casing. The shaft and chamber centers are disposed so that the rotor contacts bore 2 adjacent the bottom and beyond the port 12 relative to the direction of rotation of the rotor, or between said port and the intake passage 10, as shown in Fig. 1.

Vanes 27 are disposed in the rotor 25 for radial movement relative thereto and engaging the bore 2. These vanes are arranged and moved in a particular manner, but since this construction and arrangement is the same as that used in connection with the power rotor later described, and where such construction is of even more importance, the one full description which will be found later will suffice.

Turnably mounted in the end plate bores 22 is a hollow shaft 28 on which is mounted or formed a rotor 29, the width of and turnable in the bore 6, being concentric with but somewhat smaller diameter than said bore. Spring advanced vanes 30 are mounted radially in the rotor, which vanes at their ends are cut down in radial width and are overlapped by endless retaining and sealing rings 31 confined between annular flanges 32 formed with or secured on said rotor at its ends; these rings, as well as the vanes, engaging the bore 6 so as to form pressure-tight pockets 33 between the vanes, rotor and the chamber in which they are mounted (see Fig. 1).

Turnable in the plate bores 17 are other alined shaft sections 34 and 35, the former shaft section being hollow or tubular. A hollow rotor 36 is secured on and between the shaft sections concentric therewith, said rotor being open to the hollow shaft section 34. The centers 19 and 21 are disposed so that the rotor 36 engages the bore 4 for its full axial extent adjacent the top and ahead of the port 13, or between said port and the exhaust passage 11.

End flanges 37 which may be formed with the shaft sections 34 and 35, and which are larger than but concentric with the rotor, project outwardly from the same, said flanges being of a sufficient diameter to overlap the end walls of the casing 1 all about the chamber 5. Said plates thus project into the spaces between the end plates 14 and 15 radially out from said chamber and are maintained in sealing relation therewith by endless sealing rings 38 recessed in the plates 14 and 15 concentric with the bore 4. Similar sealing rings 39, to engage the flanges 26 of the rotor 25, are mounted in the plates 14 and 15 about and concentric with the bore 2.

The rotor 36 is formed with a plurality of radial slots 40 which are also cut through the flanges 37 to their outer periphery. Vanes 41 slide in these slots and extend the full distance between the outer faces of the flanges 37, as shown in Fig. 6. Each vane, for the portion thereof disposed within the confines of the flanges, is formed with extensions 42 projecting radially out. These extensions serve to support a rod-like sealing member 43, which is turnably supported within the extensions and whose under side turnably seats with a close fit in a trough formed in the outer face of the vane between the extensions.

The outermost bearing face 44 of the member 43 is curved to conform to the curvature of bore 4. Bosses 45 project from the ends of the vane concentric with the member 43, on which curved shoes 46 are turnable, these shoes being keyed to the adjacent ends of the member 43 by recessed cross pins 47, as shown. The shoes ride in endless tracks 48 countersunk in the plates 14 and 15 concentric with the bore 4. Similar tracks 49 are formed in the plates about the chamber 3 for the shoes of the vanes 27 of the rotor 25.

The above vane arrangement is designed so that the various sealing members 43 closely contact the wall of the bore 4, and since these members are rigid with the track engaged shoes 46, which are in turn connected with the vanes, the latter are not only positively moved in and out as the rotor turns in the eccentric chamber, but the bearing faces 44 of the sealing members always conform to the curvature of the chamber bore 4 and are thus maintained in proper pressure-tight engagement with said bore.

Since the shoes and the tracks which control the movement of the sealing members are outside the chamber 5 itself, they are not exposed to direct contact with the products of combustion within said chamber, and hence there is no tendency for them to foul or stick, and they can also be very readily kept in a properly lubricated condition.

The shafts 24, 28 and the shaft section 35, which is the driving shaft, are connected in one to one driving relation and so that the adjacent rotor is turned in opposite directions by a suitable train of gears enclosed within a housing 51 secured on the adjacent end plate 15.

A water intake fitting 52 is connected to the end of shaft 28 farthest from the shaft section 34, and a water-circulating element 53 is secured on the opposite end of said shaft 28. The element 53 is enclosed within a passage member 54 which extends to and surrounds the adjacent end of the shaft section 34, which is divided by a longitudinal diametral partition 55 into a pair of separate water passages 56 and 57. The passage 56 communicates with the member 54 and the interior of the rotor 36, while the passage 57 communicates at its inner end with said rotor and at its outer end with a conduit 58 which leads to the casing intake port 8. Cooling water therefore flows first through the rotor 29 where the heat is greatest, then into the rotor 36 and after circulating about the interior of said rotor, passes into and through the jacket 7, being finally discharged at the upper end outlet 9 above the compression chamber, so that the water in its then heated condition aids in warming the cold incoming mixture.

In operation, with the compression rotor 25 turning in an anti-clockwise direction, the various rotors are timed and coordinated in their rotation so that the fuel mixture drawn in through the port 10 will be gradually compressed between the adjacent advance by the rotation of the rotor until the compressed charges are successively discharged through the port 12 into the correspondingly positioned pockets 33 of the transfer rotor 29. When said rotor 29 has turned (in a clockwise direction) with the charges in said pockets, until the vane at the leading edge of any pocket is just about to uncover the port 13, the charge of said pocket is fired by the plug P and the charge immediately passes into the chamber just back of a vane 41. Any residue of a charge not emptied into the chamber 5 blows out through the relief passage R before a fresh charge is taken into the pocket, so as to avoid possible pre-ignition.

The fired charge passing into chamber 5 acts on the adjacent vane 41 to rotate the rotor 36 in an anti-clockwise direction, the charge thus expanding and imparting a power impulse to the rotor until the fully expanded and expended charge passes out through the exhaust port 11. In the meantime, of course, another charge has been taken in, compressed, fired and transferred, so that an overlapping flow of power impulses is had and a very smooth running engine results.

It should be noted that while the vane construction and mounting has been particularly shown and described in connection with an internal combustion engine, these features would be usable and of equal advantage in a rotary machine adapted to use steam, or arranged as a pump, compressor, or the like, and the term "engine" in the claims is intended to include all such machines.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention. as defined by the appended claims.

Having thus described my invention what I claim as new and useful and desire to secure by Letters Patent is:

1. In a rotary gas engine, a hollow power rotor, a hollow fuel mixture transfer rotor having mixture receiving pockets in which the mixture is ignited and from which the ignited mixture is then delivered to the power rotor, a casing in which the rotors are mounted and having a water jacket thereabout and a water circulating system functioning to first circulate water through the transfer rotor, then through the interior of the power rotor, and then through the jacket.

2. In a rotary gas engine, a hollow power rotor, a casing in which the rotor is mounted and having a water jacket thereabout, and a water circulating system functioning to first circulate water through the interior of the rotor and then through the jacket; said system including an axial shaft projecting from the rotor, said shaft having an axial open ended passage leading to the interior of the rotor from the outer end of the shaft and another axial passage leading from the interior of the rotor to a termination at the periphery of the shaft adjacent the outer end of said shaft, means to feed water into the outer end of the first passage and a conduit connecting the termination of the other passage and the jacket.

3. In a rotary gas engine, a hollow power rotor, a hollow fuel-mixture transfer rotor having mixture receiving pockets in which the mixture is ignited and from which said mixture is then delivered to the power rotor, a casing in which the rotors are mounted and having a water jacket thereabout and a water circulating system functioning to first circulate water through the transfer rotor, then through the interior of the power rotor and then through the jacket; said system including a tubular open ended shaft on which the transfer rotor is mounted, an axial shaft projecting from the power rotor, said axial shaft having an axial open ended passage therethrough communicating at one end with the interior of the power rotor, passage means connecting the other end of said passage and one end of the first named shaft, a water intake fitting connected to the other end of the first named shaft, the axial shaft having another axial passage communicating at one end with the interior of the power rotor and a conduit connecting the other end of the last named passage with the portion of the jacket surrounding the power rotor.

4. In a rotary gas engine, a hollow power rotor, a hollow fuel-mixture transfer rotor having mixture receiving pockets in which the mixture is ignited and from which said mixture is then delivered to the power rotor, a casing in which the rotors are mounted and having a water jacket thereabout and a water circulating system functioning to first circulate water through the transfer rotor, then through the interior of the power rotor and then through the jacket; said system including a tubular, open-ended shaft on which the transfer rotor is mounted, an axial shaft projecting from the power rotor, said axial shaft having an axial open ended passage therethrough communicating at one end with the interior of the power rotor, means to feed water into one end of the shaft, a water circulating member on the other end of the shaft, means including an enclosure about the member and an axial shaft on the power rotor forming a continuous water passage from the member to the interior of the power rotor and water passage means including said shaft leading from the power rotor to the adjacent portion of the jacket.

5. In a rotory engine, a rotor comprising a circular body, enlarged circular flanges on the ends thereof, said flanges being formed with radial and alined slots and with endless grooves in their circumferential faces, vanes extending between and across the flanges and seated in the grooves, means urging the vanes radially out, said vanes being cut down from their radially outermost faces in line with the grooves, and sealing rings forming a substantially continuous unit seated in the grooves and over the cut-down portions of the vanes, said rings extending radially out so as to be substantially flush with radially outermost faces of the vanes.

GEORGE GARBETH.